United States Patent Office 2,968,710
Patented Jan. 17, 1961

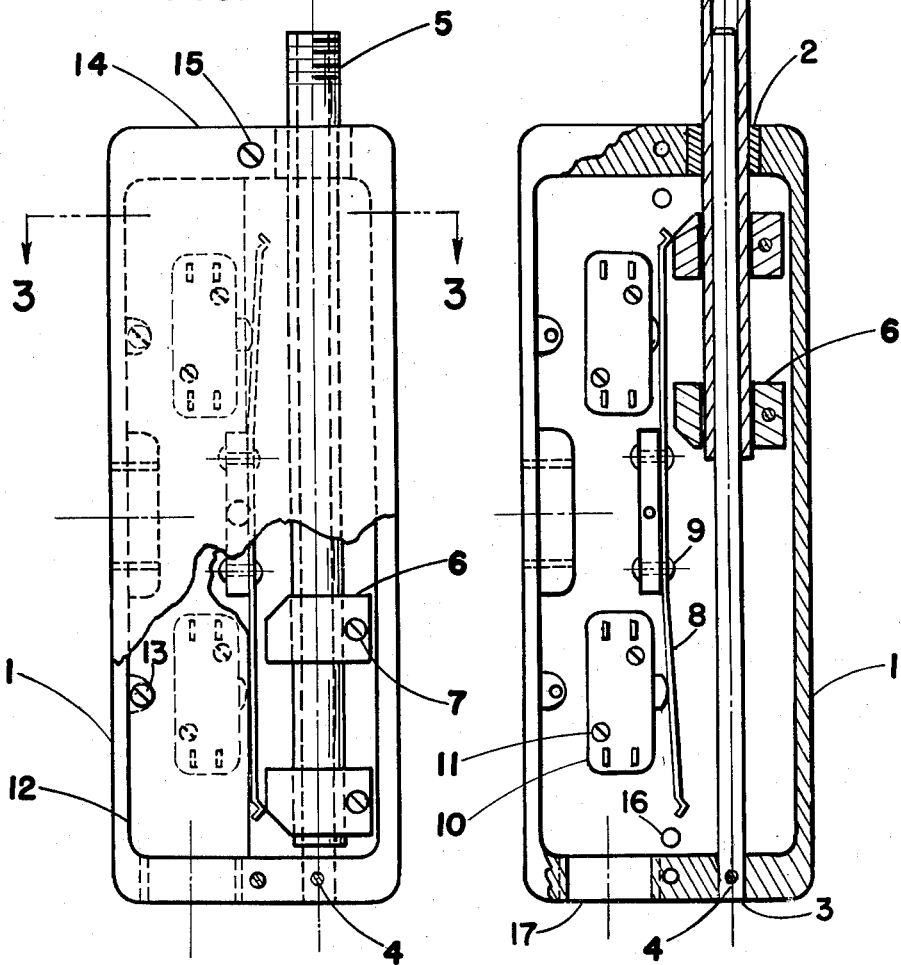

2,968,710

LINEAR CONTROL UNITS

Charles Horberg, Jr., Chicago, Ill., assignor, by mesne assignments, to Paramount Textile Machinery Co., Kankakee, Ill., a corporation of Illinois Filed Nov. 7, 1958, Ser. No. 772,548

7 Claims. (Cl. 200—168)

(a) This invention relates to machinery controls and more particularly it relates to the control of those machines constructed of individually powered, electrically controlled mechanisms. Further, this invention relates most particularly to machines comprised of the above-mentioned mechanisms, wherein a single reciprocating member is utilized to control itself or any combination of the mechanisms that make up these machines.

This invention, hereinafter referred to as a linear control unit, provides a simple enclosed linear actuating device, adapted to use with commercial snap action switches that are operated by adjustable cams mounted on a sliding actuator tube, the cam end of the actuator tube being contained within an enclosed control box, and the other end protruding through a bearinged opening in the control box wall, to provide a member for coupling the actuator tube to a reciprocating machine member. Therefore, the movement of the machine member will operate the snap action switches at any predetermined position or positions within the linear limits of travel of the reciprocating machine member, thereby controlling the reciprocating machine member or any other machine or machine member electrically operated by means of the snap action switches mounted in said linear control unit.

(b) One of the objects of my invention is to eliminate the need for the individual design of each and every actuator mechanism necessary to control machine movements on the machines described above, as is now practised in the art.

Another object of my invention is to reduce the manufacturing cost of individualized actuator mechanisms, by replacing them with these standardized, mass-produced units.

Still another object of my invention is to reduce installation costs by providing a singular enclosed switching unit that is specifically designed for easy quick mounting onto a machine component, as compared to the present method of mounting and assembling many separate elements, including limits switches, mounting brackets, actuator mounts and actuators.

An additional object of my invention is to provide a standardized control box containing switches which may be wired through a single conduit, in order to simplify wiring and reduce the amount of conduit and conduit junctions required by the present methods of wiring directly to individual switches.

Yet another object of my invention is to provide for the quick and economical repair of the individualized actuator mechanisms in the event of mechanical breakdowns, through the use of standardized interchangeable replacement parts as substitutes for replacement parts which heretofore have been custom-made.

Still another object of my invention is to assure longer mechanical switch life, by minimizing the deflection in the internal springs of the snap action switches, through a closer control of the alignment between the actuator bar and cams in their relation to the mounted switches. This advantage is gained by making standardized actuator bar and cam units on production tooling.

One of the features of this linear control unit is the simplicity yet rigidity of the molded or cast one-piece box frame.

Still another feature of this linear control unit is its availability in a familiy of specific sizes, each size with a particular stroke range to meet the stroke requirements of the coupled reciprocating member that is mechanically connected to the linear control unit.

A third unique feature of my invention is the novel manner in which the actuator tube is given guiding support as it travels to its outer limits. This is accomplished through the use of an outboard bearing, mounted in the wall of the control unit, through which the actuator tube extends, in conjunction with an internal bearing rod which extends from the opposing wall into the actuator tube to a point within the tube that is through and beyond the outboard bearing, thus giving the actuator tube maximum bearing spread.

A fourth feature of the linear control unit is a sub-cover plate made of non-metallic insulating material, such as paper filled Bakelite, that keeps the open switch terminals covered at all times, and acts to protect the operator and other persons from shock hazard when the outside cover plate is removed to facilitate cam adjustment.

The fifth feature of the linear control unit is the inclusion of two or more conduit attach openings, all but one of which include removable plugs to provide the user with a choice of said conduit attach openings in which to install his conduit wiring for convenient, quick adaptation to specific machinery wiring pattern.

The aforementioned features and other features of this invention and the manner of attaining them will become more apparent, and the invention itself will be best understood, by reference to the following description of an embodiment of the invention taken in conjunction with the accompanying drawings, wherein:

Fig. 1 is a plan view, showing the actuator tube 5 in the retracted position with the rear cam 6 depressing the rear portion of the spring actuator 8 which in turn is operating the rear snap action switch 10. The lower portion of the cover plate 14 is shown broken away to more clearly illustrate the function of the cam 6 and to show the insulating sub-cover plate 12. This insulating sub-cover plate 12 is also partially broken away to show the spring actuator attach rivet 9 more clearly.

Fig. 2 is a partially sectioned plan view with the cover plate 14 and the insulating sub-cover plate 12 shown removed, to illustrate most effectively the action that takes place resulting from the movement of the actuator tube 5 in the extended position with the front cam 6 depressing the front portion of the spring actuator 8 which in turn operates the front snap action switch 10. Further, the molded or cast one-piece box frame 1 is sectioned to show the outboard bearing 2 and the method of attachment of the internal bearing rod 3 by the spring roll pin 4 to the box frame 1. Also, the actuator tube 5 is sectioned to illustrate more clearly the function of the internal bearing rod.

Fig. 3 is a sectional view taken along line 3—3 of Fig. 1, to show first the method of mounting snap action switch 10 on a raised platform that is integrally cast or moulded as part of the box frame 1 to provide a mounting pad on which to align the switch centrally with the spring actuator 8 the cam 6 and the actuator rod 5.

Secondly, this sectional drawing is provided to show an end view of the three resting pads for the insulating sub-plate 12; namely, the two bosses for screw 13 and the mounting leg for actuator spring 8 all three of which said resting pads are integrally cast or moulded as part of the box frame.

Thirdly, this drawing shows an end view of cam 6 for the purpose of illustrating the slot cut along the center line of the actuator tube mounting hole, for the purpose of clamping cam 6 to the actuator tube 5 by tightening screw 7.

And, finally, this view is to show plate 14 in the position where it covers the linear control unit.

Referring to the drawings of my invention, the linear control unit, Figs. 1-3; detail 1 shows the cast or moulded one piece open box type construction main frame member, which incorporates mounting pads and bosses as part of its essential form; detail 2, the outboard bearing member, is fashioned of a bearing material into an annular shape, and is force-fitted into the main frame 1 for retention purposes; detail 3 is the internal bearing rod, one end of which is fastened into the main frame, detail 1, by a roll spring pin, detail 4, for the purpose of stabilizing the actuator tube, detail 5; the function of said detail 5, the actuator tube, is to carry the front and rear cams, detail 6, that are held in a clamped position by cap screw, detail 7; cam 6 is used to depress the spring actuator, detail 8, which is fastened to the main frame, detail 1, by means of the rivets, detail 9, for the purpose of operating front and rear snap action switches, detail 10, that are fastened to frame 1 by non-metallic cap screws, detail 11; detail 12, is the insulating sub-cover plate, held mounted to the frame 1 by cap screw 13; detail 14, the main frame cover plate, is held to the main frame 1, by oval head screws detail 15; detail 16 is the linear limit control unit mounting screws used to mount this unit to a stationary machine component member; detail 17, is a pipe plug for closing the unused conduit openings.

While I have described the above principles of my invention in conjunction with specific apparatus it is to be clearly understood that this description is made solely by way of example, and not as an illustration to the scope of my invention.

What is claimed as new and desired to be secured by Letters Patent is:

1. A standardized linear control unit, including a cast metal or molded plastic open box-type main frame member with commercial snap action switches mounted therein, and operated through the movement of adjustable cams clamped on a traversing actuator tube, which protrudes through and is guided by a bearinged opening in the main frame wall, and further aligned and guided internally by a bearing rod fixed to the opposite end of the main frame; the protruding end of the actuator tube serving as a coupling stem for harnessing said traversing actuator tube to a moving machine member, thus electrically controlling said machine member or a combination of machine members or other mechanisms or machines, relative to the linear position of the harnessed reciprocating member.

2. A standardized linear control unit, made in a group of specifically graded sizes, incorporating the essential parts outlined in claim 1, and each proportioned to the amount of stroke required by the coupled reciprocating member.

3. A standardized linear control unit, and in accordance with claim 1, a system of guiding supports including an outboard bearing mounted in the main frame wall, through which the actuator tube extends, plus the guiding support of an internal bearing rod, preferably of metallic construction, utilizing dissimilar metals for bearing surfaces, and said bearing rod extending from the opposing wall into the actuator tube and to a point within the tube that is through and beyond the outboard bearing, thus uniquely and continuously supporting the actuator tube as it travels to its outer limits, by maintaining the actuator tube's alignment throughout its stroke.

4. A standardized linear control unit, utilizing rectangular metal bars formed as multiple adjustable cams, one end of each cam being made into a U-clamp and provided with a tightening screw which holds it clamped to the actuator tube; the other end of said cams being bevelled on the leading side to provide an inclined surface for depressing the actuator spring as the cam is moved; said cams being mounted on a singular actuator tube, constructed preferably of metal, for the purpose of pre-determining and pre-setting switch operating positions.

5. A standardized linear control unit, as claimed in claim 1, employing an insulating sub-cover plate, constructed of such a substance as Bakelite or other comparable insulating plastic, for the purpose of protecting the operator or other persons from shock hazard when the cover plate is removed for inspection or cam setting functions.

6. A standardized linear control unit and in accordance with claim 1, the novel employment of a metallic or plastic splash-proof cover plate to complete the enclosure protecting the main working members of the said linear control unit from dust and other foreign matter.

7. An apparatus containing at least one standardized linear control unit, which linear control unit includes a cast, stamped or fabricated metal or molded plastic open box-type main frame member with commercial snap action switches mounted therein, and operated through the movement of adjustable cams clamped on a traversing actuator tube, which protrudes through and is guided by a bearinged opening in the main frame wall, and further aligned and guided internally by a bearing rod fixed to the opposite end of the main frame; the protruding end of the actuator tube serving as a coupling stem for harnessing said traversing actuator tube to a moving machine member; thus electrically controlling said machine member or a combination of machine members or other mechanisms or machines, relative to the linear position of the harnessed reciprocating member.

References Cited in the file of this patent

UNITED STATES PATENTS 1,986,527    Rach et al.              Jan. 1, 1935